(12) United States Patent
Song et al.

(10) Patent No.: US 10,128,760 B2
(45) Date of Patent: Nov. 13, 2018

(54) PCB PLANAR TRANSFORMER AND CONVERTER USING THE SAME

(71) Applicant: DELTA ELECTRONICS, INC., Taoyuan Hsien, Taiwan (CN)

(72) Inventors: Haibin Song, Taiwan (CN); Jian Zhou, Taiwan (CN)

(73) Assignee: DELTA ELECTRONICS, INC., Toayuan, Taiwan (CN)

(*) Notice: Subject to any disclaimer, the term of this patent is extended or adjusted under 35 U.S.C. 154(b) by 256 days.

(21) Appl. No.: 14/841,729

(22) Filed: Sep. 1, 2015

(65) Prior Publication Data

US 2016/0134195 A1    May 12, 2016

(30) Foreign Application Priority Data

Nov. 12, 2014   (CN) .......................... 2014 1 0637459

(51) Int. Cl.
    *H02M 3/335* (2006.01)
    *H01F 27/28* (2006.01)

(52) U.S. Cl.
    CPC .... *H02M 3/33507* (2013.01); *H01F 27/2804* (2013.01); *H01F 27/2885* (2013.01); *H02M 3/335* (2013.01)

(58) Field of Classification Search
    CPC ................................... H01F 5/00; H01F 27/28
    USPC ................... 336/84 R, 84 C, 84 M, 200, 232
    See application file for complete search history.

(56) References Cited

U.S. PATENT DOCUMENTS

| 6,888,438 B2 | 5/2005 | Hui et al. | |
| 2004/0027224 A1* | 2/2004 | Giandalia | H01F 17/0013 336/200 |
| 2004/0044382 A1* | 3/2004 | Ibrahim | A61N 1/37229 607/60 |
| 2006/0263727 A1* | 11/2006 | Lee | H01L 23/3114 430/311 |
| 2011/0018676 A1* | 1/2011 | Young | H01F 3/00 336/200 |

(Continued)

FOREIGN PATENT DOCUMENTS

| CN | 102272869 A | 12/2011 |
| JP | 10199734 A * | 7/1998 |

(Continued)

OTHER PUBLICATIONS

EESR dated Aug. 2, 2016 by the EP Office.
1st OA dated Mar. 29, 2017 by the CN Office.

*Primary Examiner* — Tsz Chan
(74) *Attorney, Agent, or Firm* — Yunling Ren

(57) ABSTRACT

A PCB planar transformer, comprising: at least one primary winding layer, each formed with a primary winding therein, wherein wire traces constituting the primary winding have a first horizontal width; at least one secondary winding layer, each formed with a secondary winding therein, wherein wire traces constituting the secondary winding have a second horizontal width; and at least one shielding layer, each located between the primary winding layer and the adjacent secondary winding layer, wherein the shielding layer is formed with a conductor therein, and the conductor in the shielding layer has a third horizontal width, wherein at least one of the first horizontal and the second horizontal width is smaller than the third horizontal width of the conductor in the shielding layer.

7 Claims, 18 Drawing Sheets

(56) References Cited

U.S. PATENT DOCUMENTS

| | | | |
|---|---|---|---|
| 2012/0274328 A1 | 11/2012 | Hanington | |
| 2013/0200982 A1* | 8/2013 | Adachi | H01F 27/365 |
| | | | 336/84 R |
| 2014/0167901 A1 | 6/2014 | Persson et al. | |
| 2015/0061805 A1* | 3/2015 | Eom | H01F 27/2804 |
| | | | 336/65 |
| 2015/0123604 A1* | 5/2015 | Lee | H01F 38/14 |
| | | | 320/108 |
| 2015/0179334 A1* | 6/2015 | Jeong | H01F 27/2885 |
| | | | 361/782 |

FOREIGN PATENT DOCUMENTS

| | | |
|---|---|---|
| WO | 2009/034179 A2 | 3/2009 |
| WO | 2012001398 A3 | 3/2009 |
| WO | 2012/001398 A2 | 1/2012 |

* cited by examiner

PCB PLANAR TRANSFORMER AND CONVERTER USING THE SAME

CROSS REFERENCE TO RELATED APPLICATION

This application is based upon and claims the benefit of priority from the prior Chinese Patent Application No. 201410637459.2 filed on Nov. 12, 2014, entitled "PCB PLANAR TRANSFORMER AND CONVERTER USING THE SAME", before Chinese State Intellectual Property Office, under 35 U.S.C. § 119. The content of the above prior Chinese Patent Application is incorporated herein by reference in its entirety.

TECHNICAL FIELD

The present disclosure relates to a printed circuit board (PCB) planar transformer, and a converter using the PCB planar transformer.

BACKGROUND

With compact structure, PCB winding transformer is now widely used in switching mode power supplies, wherein it requires high power density and/or low profile form factor. Basically, a PCB winding transformer consists of at least a primary winding and a secondary winding, and there is parasitic capacitance between them, which impact EMI performance seriously. The present disclosure is devised to control the parasitic capacitance mentioned above, so as to improve the EMI issue.

SUMMARY

The present disclosure is devised to address at least a part of the above problems.

An object of the present disclosure is to provide a PCB planar transformer, including: at least one primary winding layer, each formed with a primary winding therein, wherein wire traces constituting the primary winding have a first horizontal width; at least one secondary winding layer, each formed with a secondary winding therein, wherein wire traces constituting the secondary winding have a second horizontal width; and at least one shielding layer, each located between the primary winding layer and the adjacent secondary winding layer, wherein the shielding layer is formed with a conductor therein, and the conductor in the shielding layer has a third horizontal width, wherein at least one of the first horizontal width and the second horizontal width is smaller than the third horizontal width.

Another object of the present invention is to provide a converter, including: a PCB planar transformer, including: at least one primary winding layer, each formed with a primary winding therein, wherein wire traces constituting the primary winding have a first horizontal width; at least one secondary winding layer, each formed with a secondary winding therein, wherein wire traces constituting the secondary winding have a second horizontal width; and at least one shielding layer, each located between the primary winding layer and the adjacent secondary winding layer, wherein the shielding layer is formed with a conductor therein, and the conductor in the shielding layer has a third horizontal width, wherein at least one of the first horizontal width and the second horizontal width is smaller than the third horizontal width; an input circuit, coupled to both terminals of the primary winding, and configured to provide an input Voltage; and an output circuit, coupled to both terminals of the secondary winding, and configured to convert a voltage across the secondary winding.

An overlapping area of the secondary side and the shielding layers is the first overlapping area and an overlapping area of the primary side and the shielding layers is the second overlapping area. According to the technical solution of the PCB planar transformer of the present disclosure, even if the processing tolerance is maximum, in the product of PCB planar transformer, the differences between the first overlapping area and a designed overlapping area thereof, and between the second overlapping area and a designed overlapping area thereof, may still be reduced, or the first overlapping area and the second overlapping area may be respectively equal to their designed overlapping areas. As a result, the tolerance in the total distributed capacitance between the primary side and the secondary side caused by the processing tolerance may still be reduced. According to the aspect of the converter of the present disclosure, variance in distributed capacitance between the primary side and the secondary side among each individual PCB planar transformer used in the converter is well controlled, thus variance in EMI performance among each individual converter is well controlled. As a result, the consistency in EMI performance of mass-produced switch power supply may be improved.

BRIEF DESCRIPTION OF THE DRAWINGS

The above and other objects, features and other advantages of the present disclosure will be apparent from the following description made in conjunction with the drawings, in which.

DETAILED DESCRIPTION

Figure 1:
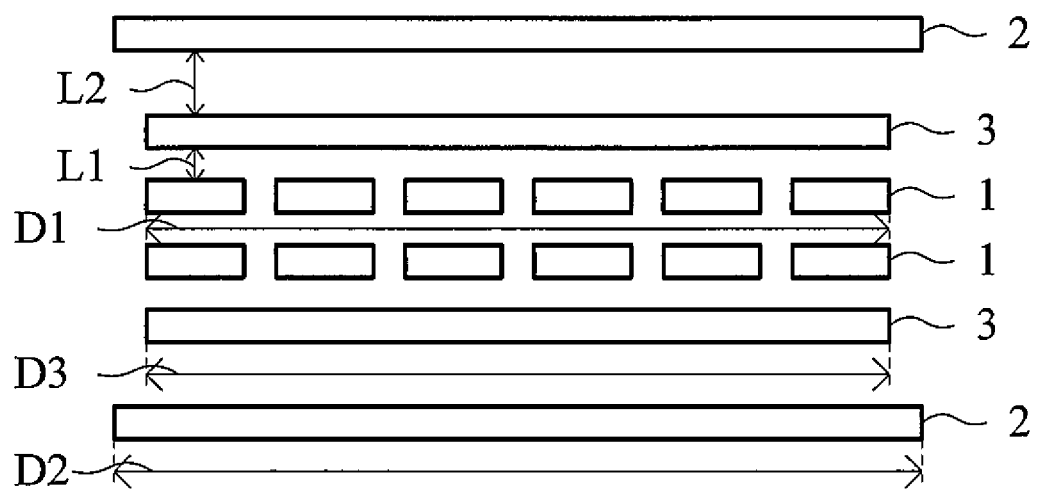
FIG. 1 is a cross-sectional drawing of a PCB planar transformer of the prior art as an example.

Hereinafter, the present disclosure will be described in detail with reference to FIGS. 1-11, in which like reference numerals refer to the same or similar devices or signals, and a symbol of each element may not only represent the element itself, but also be an algebraic sign indicating a capacity of the element.

In order to at least partially solve the above problems, the present disclosure provides a PCB planar transformer, and a converter using such a PCB planar transformer, which may significantly reduce the influence of the producing tolerance during a PCB manufacture process which may cause distributed capacitance tolerance between a primary side and a secondary side of a PCB planar transformer, thereby improving consistency in EMI performance of switching power supplies.

In order to understand the present disclosure easily, a PCB planar transformer of the prior art is firstly described.

FIG. 1 is a cross-sectional drawing of a PCB planar transformer of the prior art as an example. As illustrated in FIG. 1, the PCB planar transformer of the prior art includes: at least one primary winding layer 1, at least one secondary winding layer 2 and at least one shielding layer 3. Each primary winding layer 1 is formed with a primary winding therein, and wire traces constituting the primary winding have a first horizontal width D1. In order to illustrate easily, assumed there are two primary winding layers 1, and in each of the primary winding layers 1, six parallel turns of wires constitute the wire traces of the primary winding. Each small rectangle in each of the primary winding layers 1 represents a cross section of a turn of wire, the wire traces of the primary winding constituted by the six parallel turns of wires and the spaces between the turns (in order to illustrate easily, the spaces are neglected) have the first horizontal width D1. Each secondary winding layer 2 is formed with a secondary winding therein, and wire traces constituting the secondary winding have a second horizontal width D2. In order to illustrate easily, assumed there are two secondary winding layers 2, respectively located at the uppermost layer and the lowermost layer. In each of the secondary winding layers 2, for example, a one-turn wire constitutes the wire traces of the secondary winding. Each long rectangular in each of the secondary winding layers 2 represents a cross section of the one-turn wire. The wire traces of the secondary winding have the second horizontal width D2. Each shielding layer 3 is located between the primary winding layers 1 and the adjacent secondary winding layers 2. A conductor is formed in each of the shielding layers 3, and the conductor in each of the shielding layer 3 has a third horizontal width D3. Each long rectangular in each of the shielding layers 3 represents a cross section of the conductor having the third horizontal width D3. Furthermore, between the primary winding layers 1 and an adjacent shielding layer 3 there is a space L1, and between the secondary winding layers 2 and an adjacent shielding layer 3 there is a space L2. The width of the conductor in each of the shielding layers 3 substantially equals to the width of the wire traces constituting the primary winding in each of the primary winding layers 1. That is, D1 substantially equals to D3. Therefore the conductor exactly shields the wire traces constituting the primary winding in the primary winding layers 1.

Figure 2:
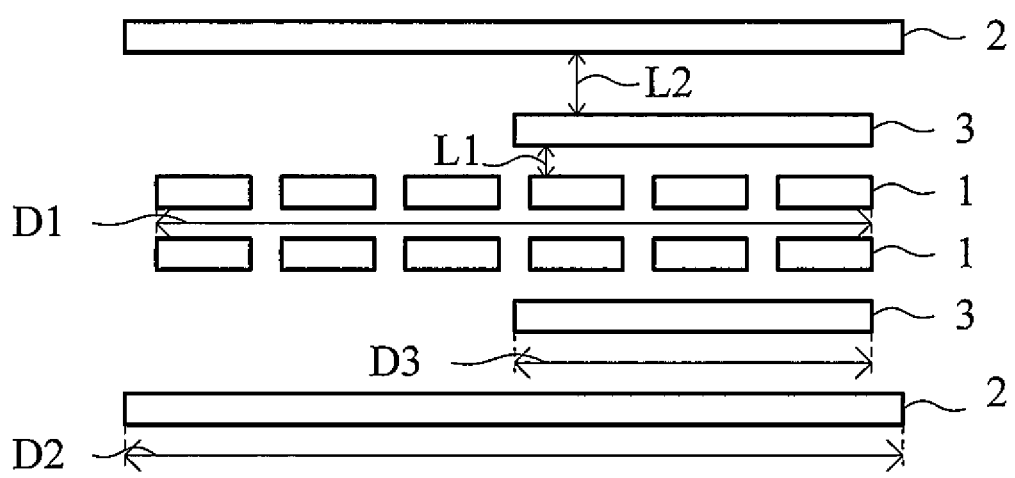
FIG. 2 is a cross-sectional drawing of a PCB planar transformer of the prior art as another example.

FIG. 2 is a cross-sectional drawing of a PCB planar transformer of the prior art as another example. The PCB planar transformer of the prior art in FIG. 2 only differs from the PCB planar transformer of the prior art in FIG. 1 in that, the width D3 of the conductor in each of the shielding layers 3 is smaller than the width D1 of the wire traces constituting the primary winding in each of the primary winding layers 1. Therefore the conductor only partially shields the wire traces constituting the primary winding in each of the primary winding layers 1. Other components are the same, which are not repeated herein.

Figure 3:
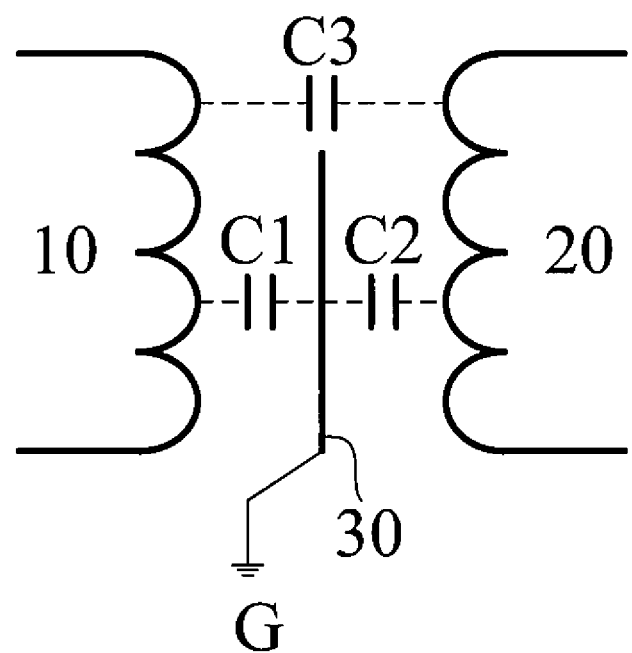
FIG. 3 is a diagram indicating that there is a distributed capacitance in a PCB planar transformer of the prior art.

FIG. 3 is a diagram indicating that there is a distributed capacitance in a PCB planar transformer of the prior art. As illustrated in FIG. 3, in the PCB planar transformer of the prior art of FIG. 1 or 2, a total distributed capacitance Cps is composed of a distributed capacitance C1 between primary winding layers 10 (i.e., the above primary winding layers 1, and the same hereinafter) and shielding layers 30 (i.e., the above shielding layers 3, and the same hereinafter), a distributed capacitance C2 between secondary winding layers 20 (i.e., the above secondary winding layers 2, and the same hereinafter) and the shielding layers 30 and a distributed capacitance C3 between the primary winding layers 10 and the secondary winding layers 20. G denotes the ground. wherein $$Cps = C3 + \frac{C1 \times C2}{C1 + C2} \qquad \text{Equation 1}$$

The PCB planar transformer is a multi-layer board. During production, some tolerances may inevitably occur in relative positions of different layers of windings. Therefore, one, two or three of the three components C1, C2 and C3 of Cps may introduce tolerances, resulting in a tolerance in Cps.

For example, if the design of the PCB transformer is as illustrated in FIG. 1, assumed:

(1) a dielectric constant of PCB medium is ε, (2) a space between the primary winding layers 1 and the adjacent shielding layer 3 is L1, (3) a space between the secondary winding layers 2 and the adjacent shielding layer 3 is L2, where L2=n×L1, (4) an area of the secondary winding layers 2 overlapping with the shielding layers 3 is S2, (5) an area of the primary winding layers 1 overlapping with the shielding layers 3 is S1. In order to illustrate easily, spaces between the turns of the primary winding layers 1 or the secondary winding layers 2 are neglected. Therefore S2 approximately equals to S1.

Then, according to the design illustrated in FIG. 1, C1, C2 and C3 are expressed respectively by the following equations:

$$C1 = \varepsilon \frac{S1}{L1} \qquad \text{Equation 2}$$

$$C2 = \varepsilon \frac{S2}{L2} = \varepsilon \frac{S1}{n \times L1} \qquad \text{Equation 3}$$

$$C3 = 0 \qquad \text{Equation 4}$$

Thus, the total distributed capacitance between the primary side and the secondary side is:

$$Cps = C3 + \frac{C1 \times C2}{C1 + C2} = \frac{1}{n+1} \times \varepsilon \frac{S1}{L1} \qquad \text{Equation 5}$$

Figure 4:
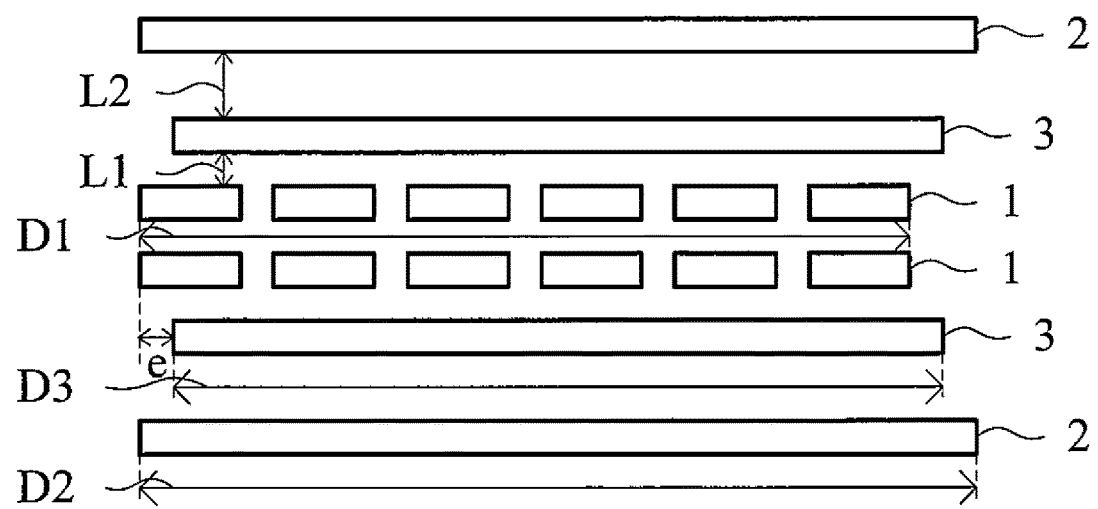
FIG. 4 is a diagram indicating that there is a producing tolerance in a PCB planar transformer of the prior art.

Due to producing tolerances, according to the design illustrated in FIG. 1, the actual product obtained may be as illustrated in FIG. 4.

FIG. 4 is a diagram indicating that there is a producing tolerance in a PCB planar transformer of the prior art. As illustrated in FIG. 4, for example, due to the producing tolerance, there is misalignment between the whole primary winding layers 1 and the shielding layers 3. One side of the primary winding layers 1 projects beyond the shielding layers 3 by a width e, and the other side thereof retracts by also about the width e (not shown). Therefore an overlapping area between the primary winding layers 1 and the shielding layers 3 is S1 minus ΔS1, where ΔS1 is caused by the width e. In such case, a distributed capacitance C'1 between the primary winding layers 1 and the shielding layers 3, a distributed capacitance C'2 between the secondary winding layers 2 and the shielding layers 3, a distributed capacitance C'3 between the primary winding layers 1 and the secondary winding layers 2, and a total distributed capacitance C'ps between the primary side and the secondary side of the PCB planar transformer are respectively:

$$C'1 = \varepsilon \frac{(1-\Delta)S1}{L1} \qquad \text{Equation 6}$$

$$C'2 = \varepsilon \frac{S2}{L2} = \varepsilon \frac{S1}{n \times L1} \qquad \text{Equation 7}$$

$$C'3 = \varepsilon \frac{\Delta S1}{L1 + S2} = \frac{\Delta}{n+1} \times \varepsilon \frac{S1}{L1} \qquad \text{Equation 8}$$

$$C'ps = C'3 + \frac{C'1 \times C'2}{C'1 + C'2} = \left(\frac{\Delta}{n+1} + \frac{1-\Delta}{n(1-\Delta)+1}\right) \times \varepsilon \frac{S1}{L1} \qquad \text{Equation 9}$$

in view that Δ is far smaller than 1, then:

$$C'ps = C'3 + \frac{C'1 \times C'2}{C'1 + C'2} = \frac{\Delta}{n+1} \times \varepsilon \frac{S1}{L1} + \frac{1}{n+1} \times \varepsilon \frac{S1}{L1} = \Delta Cps + Cps \qquad \text{Equation 10}$$

Derived from the above, it can be seen that, the tolerance in the total distributed capacitance Cps between the primary side and the secondary side of the PCB planar transformer, is in an approximately linear relationship with the producing tolerance of the PCB board.

In order to overcome the tolerance in the distributed capacitance between the primary side and the secondary side of the PCB planar transformer caused by the tolerance in producing of the multi-layer PCB board, as one aspect of the present disclosure, a new PCB planar transformer is provided. The new PCB planar transformer may greatly decrease the influence on the total distributed capacitance between the primary side and the secondary side of the PCB planar transformer caused by the PCB producing tolerance. Therefore it may improve the consistency in EMI performance of switching power supplies.

Figure 5:
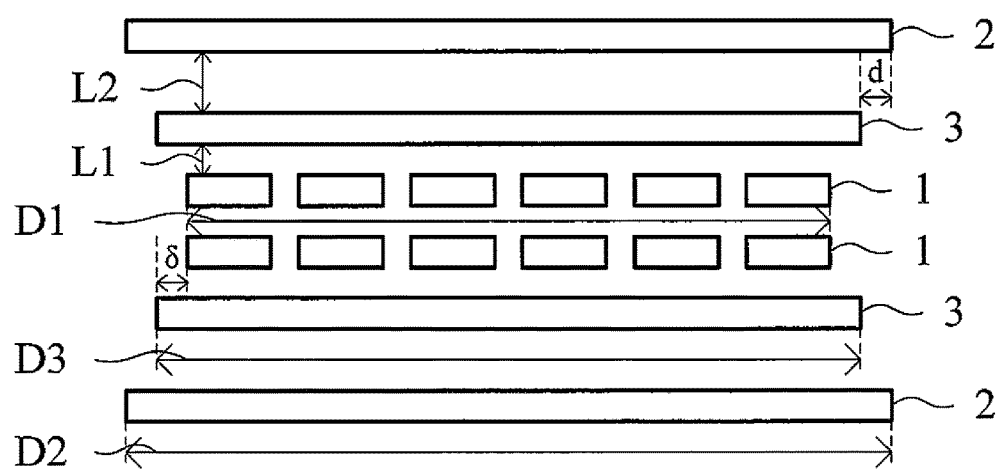
FIG. 5 is a cross-sectional drawing of a PCB planar transformer according to an embodiment of the present disclosure.

FIG. 5 is a cross-sectional drawing of a PCB planar transformer according to an embodiment of the present disclosure. As illustrated in FIG. 5, the PCB planar transformer of the present disclosure includes: at least one primary winding layer 1, at least one secondary winding layer 2 and at least one shielding layer 3. Each primary winding layer 1 is formed with a primary winding therein, and wire traces constituting the primary winding have a first horizontal width D1. That is, in each of the primary winding layers 1, parallel wires and spaces therein constitute the wire traces of the primary winding (in order to illustrate easily, the spaces are neglected). Each small rectangle in each of the primary winding layers 1 represents a cross section of a turn of wire, and the wire traces of the primary winding constituted by the parallel wires have the first horizontal width D1. Each secondary winding layer 2 is formed with a secondary winding therein, and wire traces constituting the secondary winding have a second horizontal width D2. In each of the secondary winding layers 2, parallel wires and spaces (if any) therein constitute the wire traces of the secondary winding. Each long rectangular in each of the secondary winding layers 2 represents a cross section of a one-turn wire. The wire traces of the secondary winding have a second horizontal width D2. Each shielding layer 3 is located between the primary winding layers 1 and the adjacent secondary winding layers 2. A conductor is formed in each of the shielding layer 3, and the conductor in each of the shielding layer 3 has a third horizontal width D3. That is, each long rectangular in each of the shielding layer 3 represents a cross section of the conductor having the third horizontal width D3. Furthermore, between the primary winding layers 1 and an adjacent shielding layer 3 there is a space L1, and between the secondary winding layers 2 and an adjacent shielding layer 3 there is a space L2. At least one of the first horizontal width D1 and the second horizontal width D2 is smaller than the third horizontal width D3.

It should be noted that, merely in order to illustrate easily, assumed in the PCB planar transformer illustrated in FIG. 5, the first horizontal width D1 of the wire traces of the primary winding is smaller than the third horizontal width D3 of the conductors in the shielding layers 3. For example, both sides of the wire traces of the primary winding retract from a corresponding side of the conductors in the shielding layers 3 by a predetermined value δ. On the other hand, the second horizontal width D2 of the wire traces of the secondary winding is larger than the third horizontal width D3 of the conductors in the shielding layers 3. For example, any one side or both sides of the wire traces of the secondary winding can project beyond a corresponding side of the conductors in the shielding layers 3 by an arbitrary value d.

It should be noted that, merely in order to illustrate easily, assumed in FIG. 5, there are two primary winding layers 1, and in each of the primary winding layers 1, six parallel turns of wires constitute the wire traces of the primary winding. Each small rectangle in each of the primary winding layers 1 represents a cross section of a turn of wire, and the wire traces of the primary winding constituted by the six parallel turns of wires have the first horizontal width D1. However, in practical, the number of turns or the number of layers of the primary winding layers may be other values.

It also should be noted that, merely in order to illustrate easily, assumed in FIG. 5, there are two secondary winding layers 2, respectively located at the uppermost layer and the lowermost layer. In each of the secondary winding layers 2, a one-turn wire constitutes the wire traces of the secondary winding. Each long rectangular in each of the secondary winding layers 2 represents a cross section of the one turn of wire. The wire traces of the secondary winding have the second horizontal width D2. However, in practical, the number of turns or the number of layers of the secondary winding layers 2 may be other values.

As an embodiment, in the PCB planar transformer of the present disclosure, the predetermined value δ is not smaller than the PCB manufacturing tolerance. That is, at least one of the above first horizontal width D1 and the second horizontal width D2 is smaller than the third horizontal width D3 by at least 2δ, i.e., at least two times of the PCB manufacturing tolerance. In other words, at least one of a difference value between the third horizontal width D3 and the first horizontal width D1 and a difference value between the third horizontal width D3 and the second horizontal width D2 is not smaller than two times of the predetermined value.

As an embodiment, in the PCB planar transformer of the present disclosure, neither of the arbitrary value d and the predetermined value δ is smaller than the PCB manufacturing tolerance. The above first horizontal width D1 is smaller than the third horizontal width D3 by at least 2δ, i.e., at least two times of the PCB manufacturing tolerance. The above second horizontal width D2 is larger than the third horizontal width D3 by at least 2δ, i.e., at least two times of the PCB manufacturing tolerance.

As another embodiment, in the PCB planar transformer of the present disclosure, the value of the predetermined value δ is not smaller than 0.15 mm. That is, at least one of the above first horizontal width D1 and the second horizontal width D2 is smaller than the third horizontal width D3 by at least 2δ, i.e., 0.3 mm.

As another embodiment, in the PCB planar transformer of the present disclosure, both of the values of the arbitrary valued and the predetermined value δ are not smaller than 0.15 mm. The above first horizontal width D1 is smaller than the third horizontal width D3 by at least 2δ, i.e., 0.3 mm. The above second horizontal width D2 is larger than the third horizontal width D3 by at least 2δ, i.e., 0.3 mm.

As another embodiment, in the PCB planar transformer of the present disclosure, the values of the arbitrary value d and the predetermined value δ may also be other values, and may be any value greater than zero. As such, even if a winding projects beyond the shielding layer by a displacement in lamination of the layers of the PCB planar transformer, the difference among the distributed capacitances of various transformers may still be reduced.

As an embodiment, illustrated in FIG. 5, in the PCB planar transformer of the present disclosure, the wire traces of the primary winding, the wire traces of the secondary winding and the conductors in the shielding layers 3 are center-aligned with one another as much as possible. However, according to the technical solution of the PCB planar transformer of the present disclosure, even if the processing tolerance is maximum, in the product of PCB planar transformer, an overlapping area between the secondary side and the shielding layer and an overlapping area between the primary side and the shielding layer may be respectively equal to designed overlapping areas. Therefore the tolerance in the total distributed capacitance between the primary side and the secondary side caused by the processing tolerance may still be reduced. That is, in the produced PCB planar transformer according to the technical solution of the present disclosure, even due to the processing tolerance, positions of layers may not be ensured that the wire traces of the primary winding, the wire traces of the secondary winding and the conductors in the shielding layers 3 are exactly center-aligned with one another, it may be ensured that an overlapping area between the secondary side and the shielding layer and an overlapping area between the primary side and the shielding layer may be respectively equal to designed overlapping areas.

Figure 6:
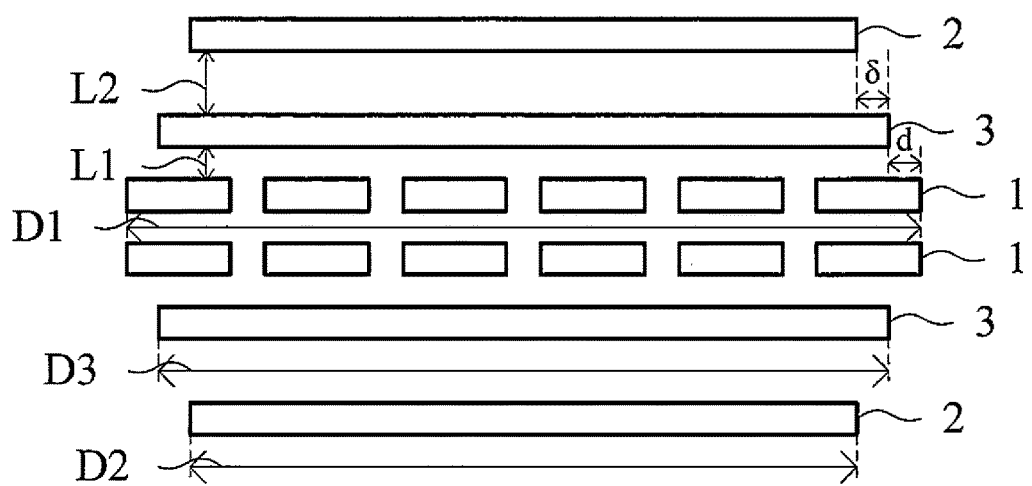
FIG. 6 is a cross-sectional drawing of a PCB planar transformer according to another embodiment of the present disclosure.

FIG. 6 is a cross-sectional drawing of a PCB planar transformer according to another embodiment of the present disclosure. FIG. 6 differs from FIG. 5 in that, in the PCB planar transformer illustrated in FIG. 6, the first horizontal width D1 of the wire traces of the primary winding is larger than the third horizontal width D3 of the conductors in the shielding layers 3. For example, any one side or both sides of the wire traces of the primary winding can project beyond a corresponding side of the conductors in the shielding layers 3 by an arbitrary value d. The second horizontal width D2 of the wire traces of the secondary winding is smaller than the third horizontal width D3 of the conductors in the shielding layers 3. For example, both sides of the wire traces of the secondary winding retract from a corresponding side of the conductors in the shielding layers 3 by a predetermined value δ.

Figure 7:
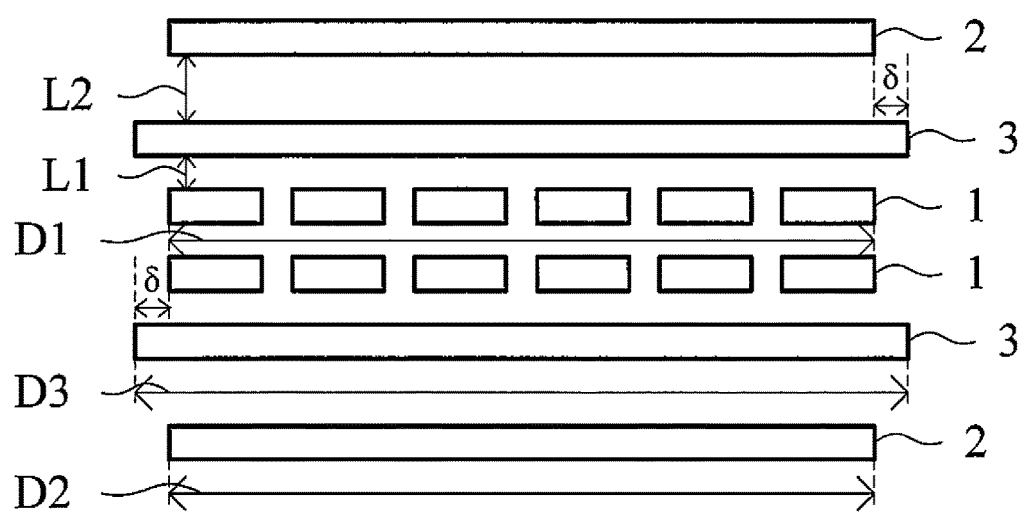
FIG. 7 is a cross-sectional drawing of a PCB planar transformer according to still another embodiment of the present disclosure.

FIG. 7 is a cross-sectional drawing of a PCB planar transformer according to still another embodiment of the present disclosure. FIG. 7 differs from FIG. 5 in that, in the PCB planar transformer illustrated in FIG. 7, the first horizontal width D1 of the wire traces of the primary winding is smaller than the third horizontal width D3 of the conductors in the shielding layers 3. For example, both sides of the wire traces of the primary winding retract from a corresponding side of the conductors in the shielding layers 3 by a predetermined value δ. The second horizontal width D2 of the wire traces of the secondary winding is also smaller than the third horizontal width D3 of the conductors in the shielding layers 3. For example; both sides of the wire traces of the secondary winding also retract from a corresponding side of the conductors in the shielding layers 3 by a predetermined value δ.

The selection of the arbitrary value d and the predetermined value δ in FIG. 6 or 7 is similar to that of FIG. 5, which will not be repeated.

As another embodiment, in the PCB planar transformer of the present disclosure, wire traces which have a horizontal width smaller than the third horizontal width D3 in the wire traces of the primary winding and the wire traces of the secondary winding, have a projection on the shielding layer that is not beyond the conductors in the shielding layers 3. That is, as illustrated in FIGS. 5 through 7, wire traces in the wire traces of the primary winding and the wire traces of the secondary winding which have a horizontal width smaller than the third horizontal width D3, have a projection on the shielding layer that is within the conductors in the shielding layers 3.

As another embodiment, in the PCB planar transformer of the present disclosure, the wire traces of the primary winding and the wire traces of the secondary winding do not directly face each other. As illustrated in FIG. 5, the wire traces of the primary winding layers 1 are completely shielded by the shielding layers 3. As illustrated in FIG. 6, the wire traces of the secondary winding layers 2 are completely shielded by the shielding layers 3. As illustrated in FIG. 7, both of the wire traces of the primary winding layers 1 and the wire traces of the secondary winding layers 2 are completely shielded by the shielding layer 3. That is, the wire traces of the primary winding and the wire traces of the secondary winding do not directly face each other.

In the PCB planar transformer of the present disclosure, both the primary winding layer 1 and the secondary winding layer 2 may be a single layer. However, as another embodiment, at least one of the primary winding layer 1 and the secondary winding layer 2 may be more than one layer. That is, both the primary winding layer 1 and the secondary winding layer 2 may have a plurality of layers.

As another embodiment, in the PCB planar transformer of the present disclosure, there are two secondary winding layers 2, respectively located above and below the primary winding layers 1, and there are two shielding layers 3, respectively located between primary winding layers 1 and the adjacent secondary winding layers 2, as illustrated in FIGS. 5 through 7.

Figure 8A:
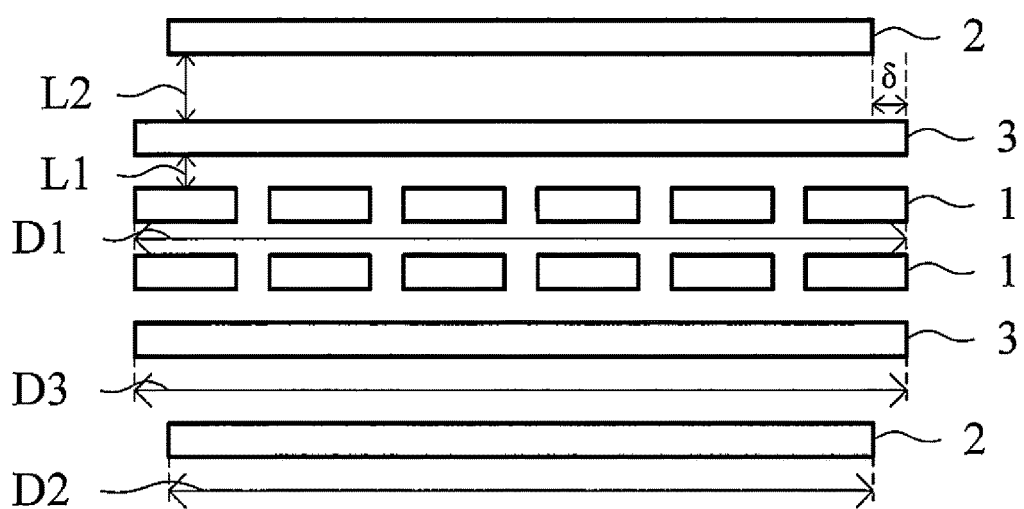
FIG. 8A is a cross-sectional drawing of a PCB planar transformer according to still another embodiment of the present disclosure.

FIG. 8A is a cross-sectional drawing of a PCB planar transformer according to still another embodiment of the present disclosure. FIG. 8A differs from FIG. 5 in that, in the PCB planar transformer illustrated in FIG. 8A, the first horizontal width D1 of the wire traces of the primary winding is substantially equal to the third horizontal width D3 of the conductors in the shielding layers 3. The second horizontal width D2 of the wire traces of the secondary winding is smaller than the third horizontal width D3 of the conductors in the shielding layers 3. For example, both sides of the wire traces of the secondary winding retract from a corresponding side of the conductors in the shielding layers 3 by a predetermined value δ.

Figure 8B:
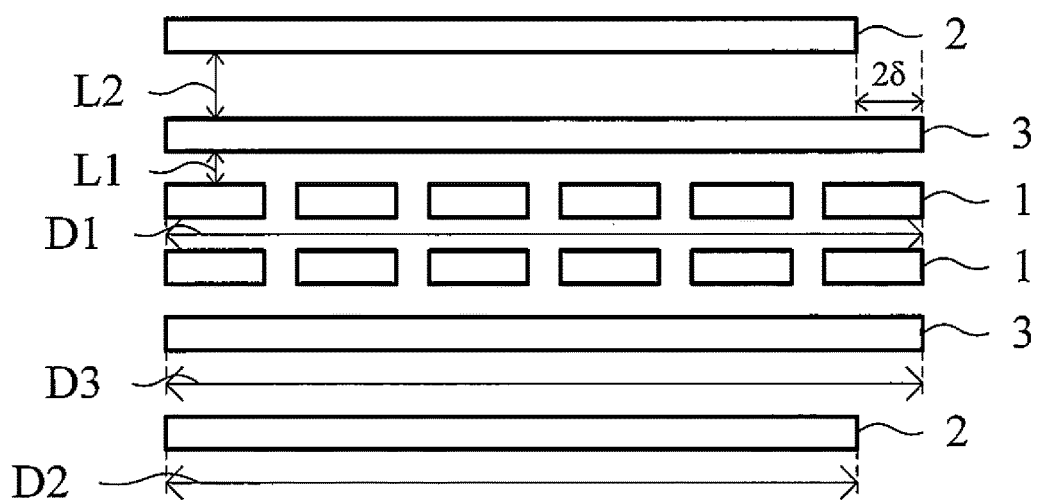
FIG. 8B is an effect drawing of a PCB planar transformer according to the technical solution of FIG. 8A.

FIG. 8B is an effect drawing of a PCB planar transformer according to the technical solution of FIG. 8A. As illustrated in FIG. 8B, the secondary windings of the upper and the lower layers of the secondary winding layers 2 are biased to one side due to the processing tolerance.

Figure 8C:
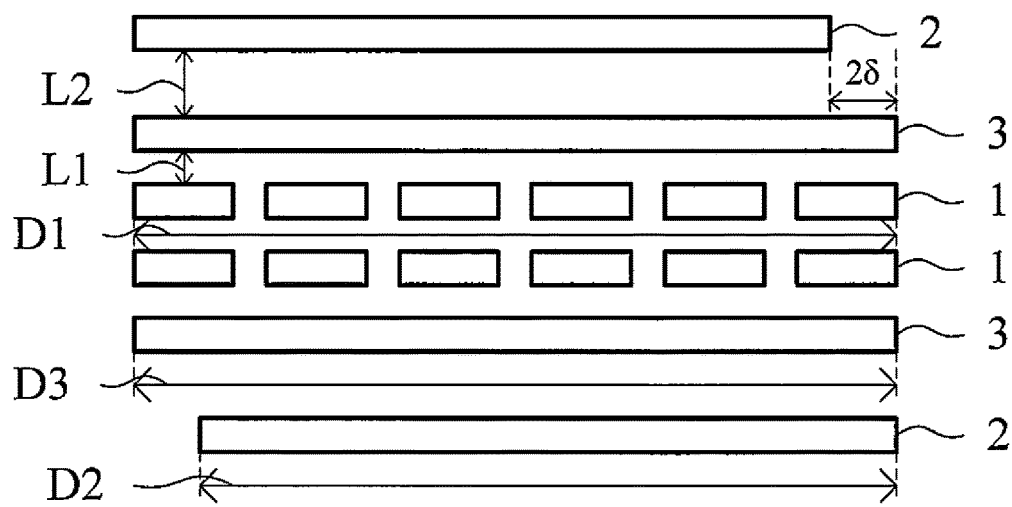
FIG. 8C is an effect drawing of another PCB planar transformer according to the technical solution of FIG. 8A.

FIG. 8C is an effect drawing of another PCB planar transformer according to the technical solution of FIG. 8A. As illustrated in FIG. 8C, the secondary windings of the upper and the lower layers of the secondary winding layers 2 are biased to two different sides respectively due to the processing tolerance.

Figure 8D:
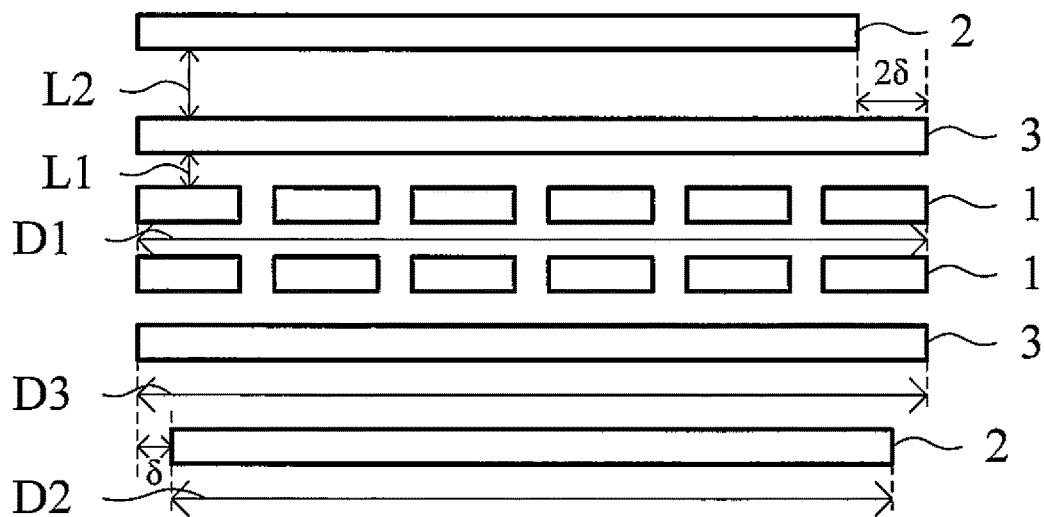
FIG. 8D is an effect of still another PCB planar transformer according to the technical solution of FIG. 8A.

FIG. 8D is an effect drawing of still another PCB planar transformer according to the technical solution of FIG. 8A. As illustrated in FIG. 8D, the secondary winding of the upper layer of the secondary winding layers 2 is biased to one side due to the processing tolerance.

Figure 8E:
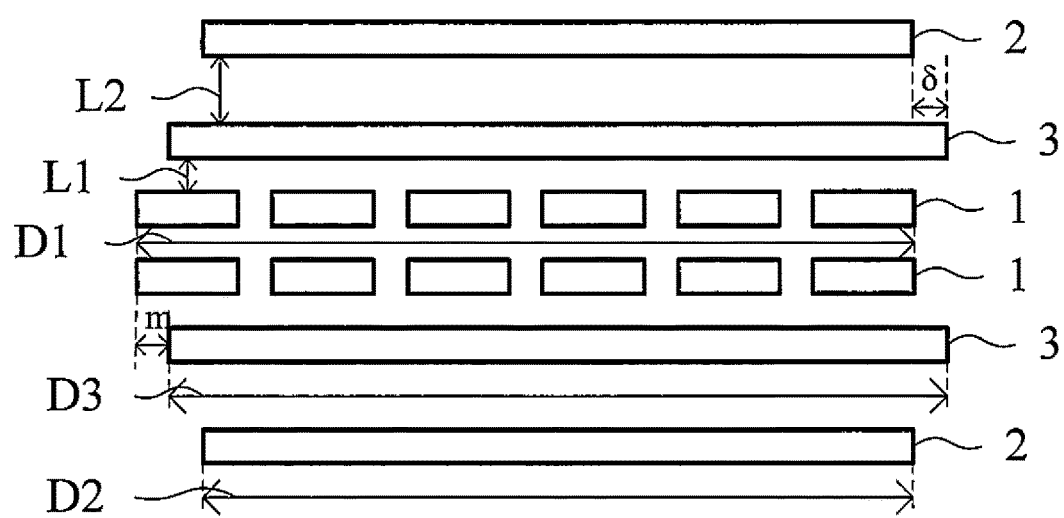
FIG. 8E is an effect drawing of still another PCB planar transformer according to the technical solution of FIG. 8A.

FIG. 8E is an effect drawing of still another PCB planar transformer according to the technical solution of FIG. 8A. As illustrated in FIG. 8E, the primary windings of the primary winding layers 1 are biased to one side due to the processing tolerance.

Figure 8F:
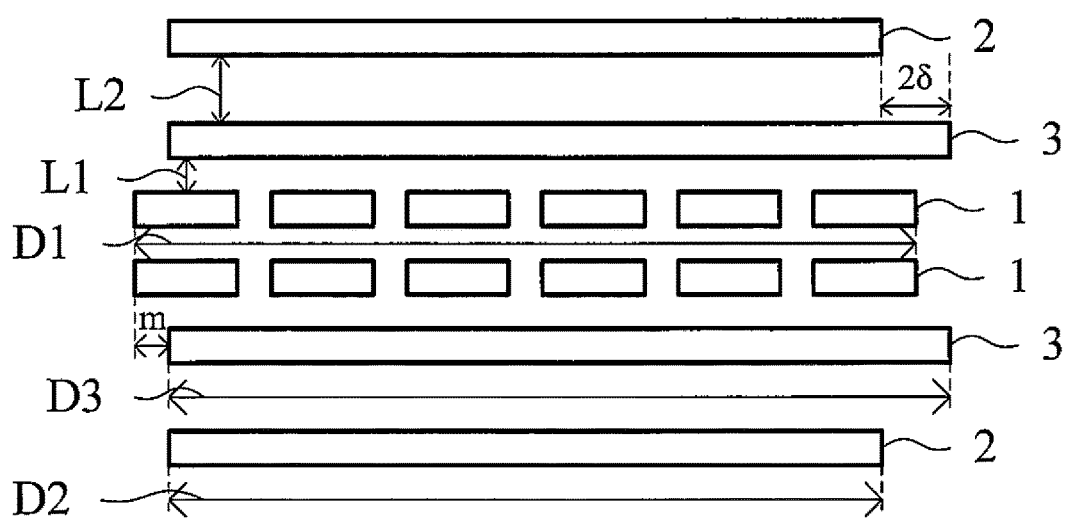
FIG. 8F is an effect drawing of another PCB planar transformer according to the technical solution of FIG. 8A.

FIG. 8F is an effect drawing of still another PCB planar transformer according to the technical solution of FIG. 8A. As illustrated in FIG. 8F, the secondary windings of the upper and the lower layers of the secondary winding layers 2 are biased to one side due to the processing tolerance, and the primary windings of the primary winding layers 1 are biased to the same side as that of the secondary winding layers 2 by a width m due to the processing tolerance.

Figure 8G:
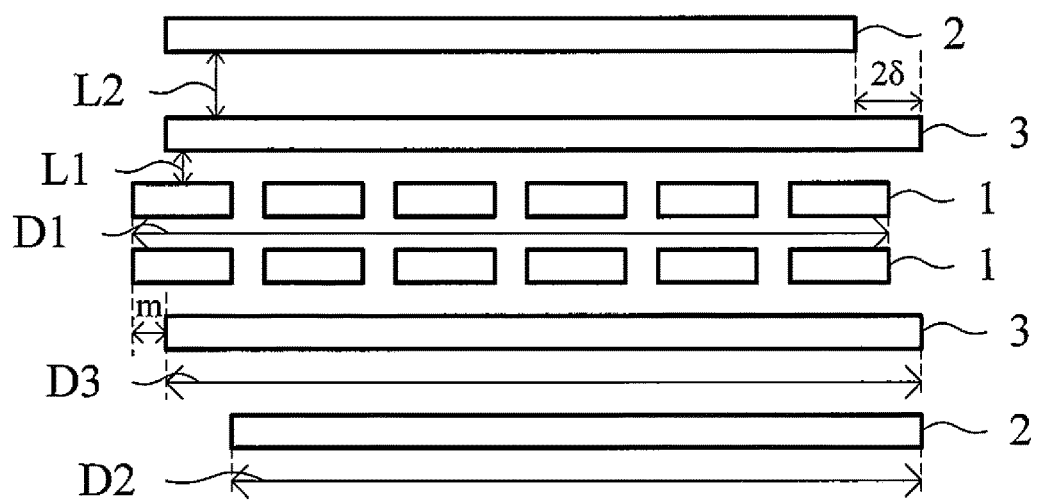
FIG. 8G is an effect drawing of still another PCB planar transformer according to the technical solution of FIG. 8A.

FIG. 8G is an effect drawing of still another PCB planar transformer according to the technical solution of FIG. 8A. As illustrated in FIG. 8G, the secondary windings of the upper and the lower layers of the secondary winding layers 2 are biased to two different sides respectively due to the processing tolerance, and the primary windings of the primary winding layers 1 are biased to one side by a width m due to the processing tolerance.

Figure 8H:
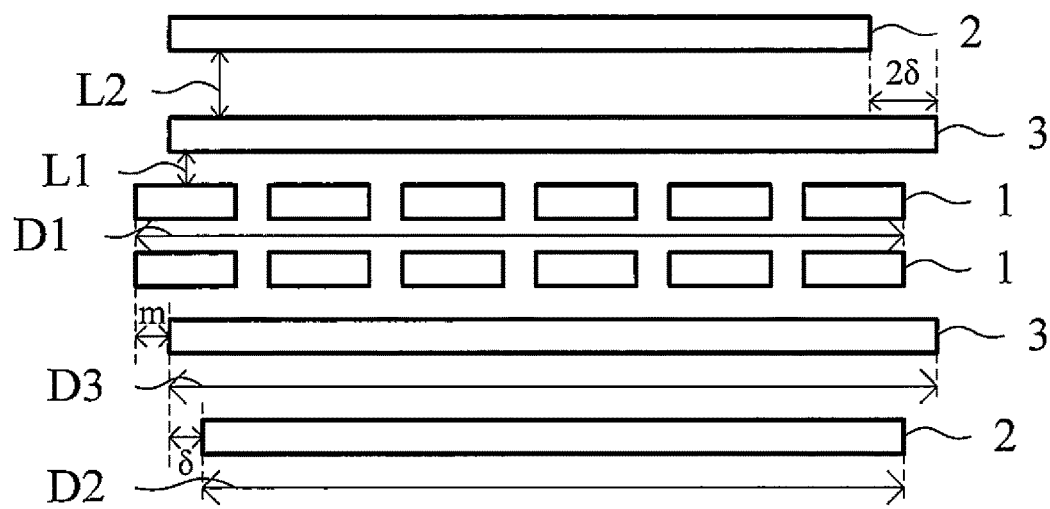
FIG. 8H is an effect drawing of still another PCB planar transformer according to the technical solution of FIG. 8A.

FIG. 8H is an effect drawing of still another PCB planar transformer according to the technical solution of FIG. 8A. As illustrated in FIG. 8H, the secondary winding of the upper layer of the secondary winding layers 2 is biased to one side due to the processing tolerance, and the primary windings of the primary winding layers 1 are biased to one side by a width m due to the processing tolerance.

It can be seen that, in the produced PCB planar transformer according to the technical solution of the present disclosure as illustrated in FIGS. 8A through 8H, even due to the processing tolerance, positions of layers may not be ensured that the wire traces of the primary winding, the wire traces of the secondary winding and the conductors in the shielding layers 3 are exactly center-aligned with one another, the differences between an overlapping area of the secondary side and the shielding layers and a designed overlapping area thereof, and between an overlapping area of the primary side and the shielding layers and a designed overlapping area thereof, may still be reduced. Therefore the tolerance in the distributed capacitance between the primary side and the secondary side of the PCB planar transformer may still be reduced.

Further, in addition to the positional relationship among layers of the PCB planar transformer product of the present disclosure as illustrated in FIGS. 8A-8H, those skilled in the art may anticipate other PCB planar transformers with other positional relationships among layers, based on the technical solution of the present disclosure.

Figure 9:
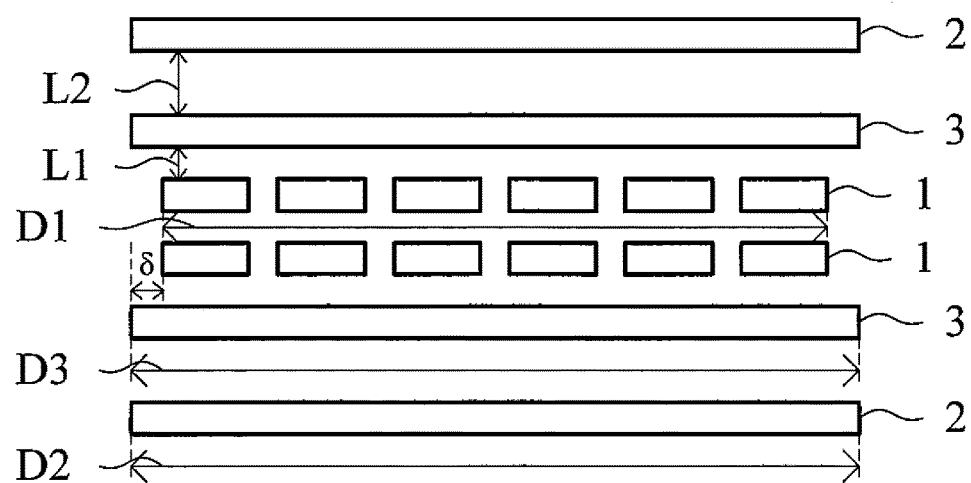
FIG. 9 is a cross-sectional drawing of a PCB planar transformer according to still another embodiment of the present disclosure.

FIG. 9 is a cross-sectional drawing of a PCB planar transformer according to still another embodiment of the present disclosure. FIG. 9 differs from FIG. 5 in that, in the PCB planar transformer illustrated in FIG. 9, the first horizontal width D1 of the wire traces of the primary winding is smaller than the third horizontal width D3 of the conductors in the shielding layers 3. For example, both sides of the wire traces of the primary winding retract from a corresponding side of the conductors in the shielding layers 3 by a predetermined value δ. The second horizontal width D2 of the wire traces of the secondary winding is substantially equal to the third horizontal width D3 of the conductors in the shielding layers 3.

Similar to FIG. 8A, corresponding to the technical solutions illustrated in FIGS. 5, 6, 7 and 9, PCB planar transformer products with various processing tolerances similar to those illustrated in FIGS. 8A-8H may be obtained (which is omitted in order to avoid duplication of specific description).

In the PCB planar transformer of the present disclosure, the value of the predetermined value δ may also be other values, and may be any value greater than zero. As such, even if a winding projects beyond the shielding layers by a processing tolerance of the layers of the PCB planar transformer, the overlapping area between the secondary side and the shielding layer and the overlapping area between the primary side and the shielding layer are respectively equal to their designed overlapping areas. Therefore the difference among the distributed capacitances of various transformers may still be reduced, as illustrated in FIGS. 8E-8H. The products as illustrated in FIGS. 5, 6, 7, 8A-8D may almost completely avoid the tolerance in the overlapping area caused by the processing tolerance, namely Δ=0 in equation 10, wherein Δ is the overlapping area tolerance caused by the processing tolerance. Therefore the difference among distributed capacitances due to lamination displacements can be almost completely avoided, namely ΔCps is almost 0 in equation 10, wherein ΔCps is the difference among distributed capacitances caused by the tolerance in overlapping area. That is, in the product of PCB planar transformer of the present disclosure, even if the processing tolerance is maximum, an overlapping area between the secondary side and the shielding layer and an overlapping area between the primary side and the shielding layer may be respectively equal to their designed overlapping areas. Therefore the difference among distributed capacitances caused by the processing tolerance may be almost avoided. That is, the tolerance in the total distributed capacitance between the primary side and the secondary side caused by the processing tolerance may still be reduced.

Corresponding to the PCB planar transformer of the present disclosure, as another aspect of the present disclosure, a converter using such a PCB planar transformer is provided.

Figure 10:
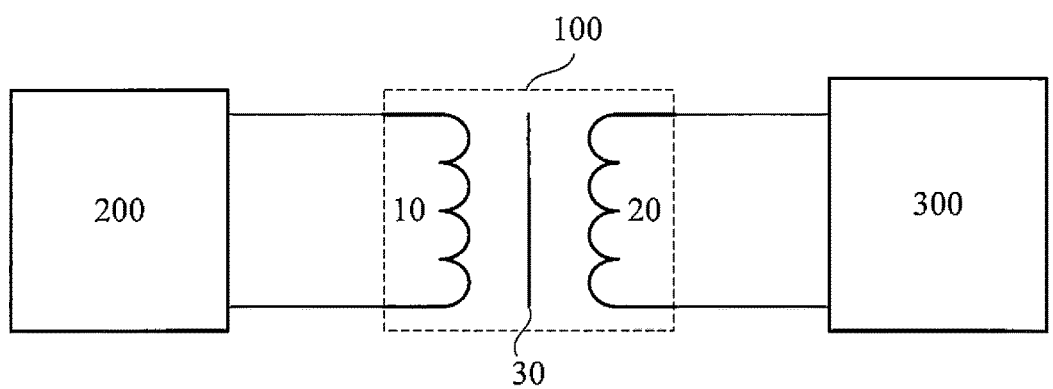
FIG. 10 is a block diagram of a converter according to an embodiment of the present disclosure.

FIG. 10 is a block diagram of a converter according to an embodiment of the present disclosure. As illustrated in FIG. 10, the converter according to an embodiment of the present disclosure includes: a PCB planar transformer 100 of the present disclosure as described with reference to FIGS. 5-9, an input circuit 200 and an output circuit 300. The PCB planar transformer 100 includes: at least one primary winding layer 10, each formed with a primary winding therein, wherein wire traces constituting the primary winding have a first horizontal width D1; at least one secondary winding layer 20, each formed with a secondary winding therein, wherein wire traces constituting the secondary winding have a second horizontal width D2; and at least one shielding layer 30, each located between the primary winding layers 10 and the adjacent secondary winding layer 20, wherein each of the shielding layers 30 is formed with a conductor therein, and the conductors in the shielding layers 30 have a third horizontal width D3, wherein at least one of the first horizontal width D1 and the second horizontal width D2 is smaller than the third horizontal width D3. The input circuit 200 is coupled to both terminals of the primary winding of the PCB planar transformer 100, so as to provide an input voltage to the primary winding of the PCB planar transformer 100. The output circuit 300 is coupled to both terminals of the secondary winding of the PCB planar transformer 100, to convert a voltage across the secondary winding of the PCB planar transformer 100 so as to provide energy to a load of the converter.

Figure 11:
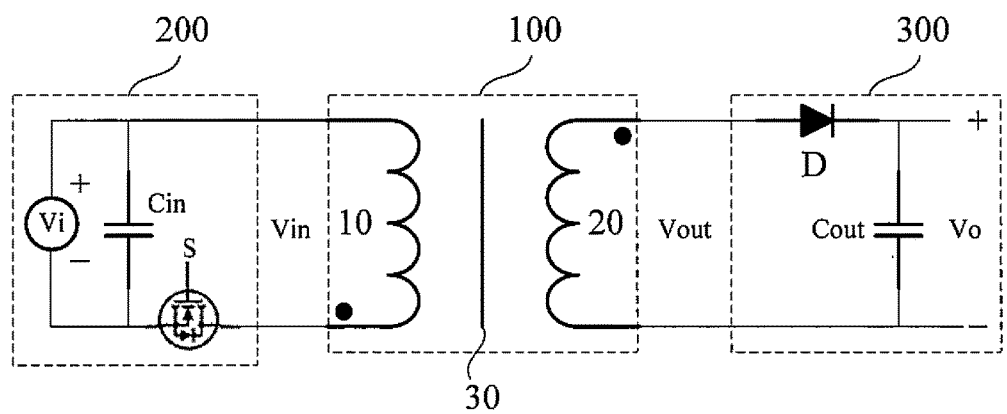
FIG. 11 is a block diagram of a fly-back converter according to an embodiment of the present disclosure.

As another embodiment, the converter illustrated in FIG. 10 is a fly-back converter. FIG. 11 is a block diagram of a fly-back converter according to an embodiment of the present disclosure. As illustrated in FIG. 11, the fly-back converter according to an embodiment of the present disclosure includes: a PCB planar transformer 100 as illustrated in FIG. 10, wherein black dots shows homonymous terminals; an input circuit 200, including a input filter capacitor Cin and a switching element S with a connection relationship as illustrated in FIG. 11, configured to convert an input direct current voltage Vi to an input voltage Vin to provide it to the primary winding of the PCB planar transformer 100; and an output circuit 300, including a diode D and a output filter capacitor Cout with a connection relationship as illustrated in FIG. 11, configured to convert a voltage across the secondary winding of the PCB planar transformer 100 so as to provide energy, i.e., a direct current voltage Vo to a load of the converter. The input circuit 200 and the output circuit 300 may be implemented with various circuits well known in the art, which will not be repeated herein.

According to the converter of the present disclosure, variance in the distributed capacitance between the primary side and the secondary side among each individual PCB planar transformer used in the converter is well controlled. Therefore variance in EMI performance among each individual converter is well controlled. Therefore the consistency in EMI performance of mass-produced switch power supply is improved.

Although the present disclosure has been described with reference to exemplary embodiments, it should be understood that the terminology used herein is illustrative and exemplary, rather than restrictive. Since the present disclosure may be embodied in various forms, it should be understood that, the above-described embodiments are not limited to any of the foregoing details, but should be construed broadly within the scope defined by the appended claims. Therefore all variations and modifications falling in the scope defined by the appended claims and equivalents thereof should be covered by the appended claims.

What is claimed is:

1. A PCB planar transformer, comprising:
   at least one primary winding layer, each formed with a primary winding therein, wherein wire traces constituting the primary winding have a first horizontal width;
   at least one secondary winding layer, each formed with a secondary winding therein, wherein wire traces constituting the secondary winding have a second horizontal width; and
   at least one shielding layer, each located between the primary winding layer and the adjacent secondary winding layer, wherein the shielding layer is formed with a conductor therein, and the conductor in the shielding layer has a third horizontal width,
   wherein the first horizontal width is smaller than the third horizontal width of the conductor in the shielding layer and the third horizontal width of the conductor in the shielding layer is smaller than the second horizontal width, wherein at least one of a difference value between the third horizontal width and the first horizontal width and a difference value between the third horizontal width and the second horizontal width is bigger than 0.3 mm.

2. The PCB planar transformer according to claim 1, wherein the wire traces of the primary winding and the wire traces of the secondary winding do not directly face each other.

3. The PCB planar transformer according to claim 1, wherein the second horizontal width is smaller than the third horizontal width, and the first horizontal width is larger than or equal to the third horizontal width.

4. The PCB planar transformer according to claim 1, wherein both the first horizontal width and the second horizontal width are smaller than the third horizontal width.

5. The PCB planar transformer according to claim 1, wherein the wire traces of the primary winding, the wire traces of the secondary winding and the conductor in the shielding layer are center-aligned with each other.

6. The PCB planar transformer according to claim 1, wherein at least one of the primary winding layer and the secondary winding layer has more than one layer.

7. The PCB planar transformer according to claim 6, wherein the secondary winding layer has two layers respectively located above and below the primary winding layer, and the shielding layer has two layers respectively located between the primary winding layer and the adjacent secondary winding layer.

* * * * *